United States Patent [19]

Clegg

[11] Patent Number: 4,609,357

[45] Date of Patent: Sep. 2, 1986

[54] PHONETIC LANGUAGE TRANSLATION METHOD

[76] Inventor: Gwendolyn M. Clegg, Rte. 2, Box 378X, Harriman, Tenn. 37748

[21] Appl. No.: 519,398

[22] Filed: Aug. 1, 1983

[51] Int. Cl.$^4$ .............................................. G09B 19/04
[52] U.S. Cl. .................................... 434/167; 434/156; 434/178; 283/46
[58] Field of Search ....................... 434/156, 167, 178; 283/46

[56] References Cited

U.S. PATENT DOCUMENTS

| | | | |
|---|---|---|---|
| 395,120 | 12/1888 | Campbell | 283/46 |
| 3,426,451 | 2/1969 | Hoffmann | 283/46 |

*Primary Examiner*—Leo P. Picard
*Attorney, Agent, or Firm*—Pitts and Brittian

[57] ABSTRACT

A phonetic language translation method for translating a word of any one of various languages into a simplified graphically expressed phonetically correct translation of such word so as to convey the proper pronunciation of such word to a reader. The method comprises the steps of eliminating all silent alphabetic characters, or combinations of characters, and representing all alphabetic characters, or combinations of characters, of the word which phonetically express the traditional speech sound of a single alphabetic character with such single alphabetic character. Representing all alphabetic characters and combinations of characters which phonetically express the alphabetic character name of a single alphabetic character with that single alphabetic character coded with a preselected coding symbol. Representing a speech sound expressing neither the traditional sound of an alphabetic character, or the alphabetic character name of a given character, with a preselected coded translation character. Further, the word is divided into sounded syllables, such division being marked with preselected coding symbols, with the accented or stressed syllable also marked with a further preselected coding symbol. Any visual similarity between a traditionally expressed word and a sounded translation of the present method is broken by altering the horizontal alignment of at least one character in the sounded translation.

7 Claims, No Drawings

PHONETIC LANGUAGE TRANSLATION METHOD

TECHNICAL FIELD

This invention relates to a phonetic language translation method for translating a work of any one of various languages into a simplified graphically expressed phonetically correct translation of such word so as to convey to a reader the correct pronunciation of such word.

BACKGROUND ART

In the English language, there are essentially three hundred seventy nine (379) letters, and letter combinations, which phonetically express basically only forty-four (44) sounds. Thus, in many instances, a given language sound may be graphically expressed with various different letters and letter combinations making for a great deal of redundancy in the graphic expression of the English language. This built-in redundancy is not limited to the English language, but, rather is found in other languages. Further, the English language, and to some extent all languages, are replete with silent letters and irregular means of graphically expressing various sounds which defy the traditional rules of pronunciation and, thus, do not covey the appropriate pronunciation of the word to a reader. Consequently, when learning to read, it is not enough to learn the basic rules of pronunciation. One must deal with a seemingly endless list of irregularly expressed words, to a large extent by simply memorizing the correct pronunciation.

Therefore, in the teaching of reading skills, it is desirable to have a means for conveying the proper pronunciation of a word regardless of its spelling or graphical depiction. The pronunciation keys found in various dictionaries provide some assistance in ascertaining the proper pronunciation of a word, but for the most part these keys consist of the application of symbols to the traditionally expressed word so as to provide clues to pronunciation. However, such pronunciation keys are complex in and of themselves and require the mastering of numerous graphic representations of the various sounds or the repetitive and exhausting resort to pronunciation tables to ascertain the proper pronunciation. This complexity makes such pronunciation keys impractical for the very individuals who require pronunciation assistance the most, those individuals being beginning readers or those wishing to master a second language.

Therefore, it is an object of the present invention to provide a phonetic language translation method for translating a word of any one of various languages into a graphically expressed phonetically correct translation of such word.

It is another object of the present invention to provide a phonetic language translation method for conveying proper pronunciation of a word to a reader utilizing a minimum number of characters and symbols to express the various sounds of a given language.

It is yet another object of the present invention to provide a phonetic language translation method which may be easily learned and utilized by a non-reader or one who possesses limited reading skills.

DISCLOSURE OF THE INVENTION

Other objects and advantages will be accomplished by the method of the present invention which provides a phonetic language translation method for translating a word of any one of various languages into a simplified graphically expressed phonetically correct translation of such word so as to convey the proper pronunciation of such word to a reader. More specifically, the method comprises the steps of eliminating all silent alphabetic characters, or combinations of characters, and representing all alphabetic characters, or combinations of characters, of the word which phonetically express the traditional speech sound of a single alphabetic character with that single alphabetic character. All alphabetic characters and combinations of characters which phonetically express the alphabetic character name of a single alphabetic character are represented with that single alphabetic character coded with a preselected coding symbol. Where a speech sound expresses neither the traditional sound of an alphabetic character, nor the alphabetic character name of a given character, such sound is represented by a preselected coded translation character. Further, the word is divided into sounded syllables, such division being marked with preselected coding symbols, with the accent or stressed syllable also being marked with a further preselected coding symbol. Any visual similarity between a traditionally expressed word and the sounded translation of the present method is broken by altering the horizontal alignment of at least one character in the sounded translation.

BEST MODE FOR CARRYING OUT THE INVENTION

As used in connection with the English language, the phonetic reading method of the present invention is based on phonic characters composed of the twenty-six (26) alphabet letters, plus twelve (12) additional coded translation characters. Through the use of these phonic characters and symbols, all the forty-four (44) sounds of the English language and the three hundred seventy-nine (379) letters, and letter combinations that make up these sounds, are represented, thus reducing all visual English to an associated sounded system. The method greatly simplifies the graphic expression of traditional English text while at the same time giving the correct pronunciation of various words comprising such text. Of course, given the variations in the number of sounds utilized in various languages, the number of phonic characters and symbols may vary when the phonetic reading method is used in connection with other languages as will be further discussed below.

In the utilization of the method, a given word is reduced to the above referenced phonic characters and symbols by first eliminating all silent letters. For example, the "w" in the traditional English word "wrong" would not be represented when reduced to the phonic characters of the present method. Non-readers have no idea which, if any, letters are silent. Thus, the method of the present invention utilizes no silent characters, and only sounded letters or syllables are represented. Further, in the present method, traditional phonetic sounds are represented by uncoded alphabet letters. The sounds represented are exemplified in Table 1 below.

TABLE 1

| | |
|---|---|
| a as in ant | n as in no |
| b as in boy | o as in hot |
| c as in cat | p as in pop |
| d as in dog | q as in quit |
| e as in ever | r as in run |
| f as in fun | s as in sun |
| g as in go | t as in top |
| h as in hop | u as in ugly |

TABLE 1-continued

| | |
|---|---|
| i as in it | v as in view |
| j as in job | w as in we |
| k as in king* | x as in box |
| l as in lot | y as in yet |
| m as in man | z as in zoo |

*However, it is desirable that the letter "c" be used to represent both the traditional phonic sound of the letter "c" and the letter "k" so as to avoid redundancy.

As indicated above, certain coding symbols are utilized with the method of the present invention, one such coding symbol being a black dot placed over a phonic character. When a phonic character is coded with a black dot, the phonic character expresses or represents that alphabetic character's letter name. For example, the coded phonic character "å" represents the sound of the alphabetic letter "a" as in the word "ape". The sounds represented by such black dot coding of the various phonic characters are set forth in Table 2 below.

TABLE 2

| | |
|---|---|
| ȧ as in ape | ṅ as in inner |
| ḃ as in beaver | ȯ as in open |
| ċ as in Ceasar | ṗ as in peak |
| ḋ as in deep | q̇ as in que |
| ė as in Easter | ṙ as in art |
| ḟ as in effort | ṡ as in Ester |
| ġ as in genes | ṫ as in team |
| ḣ as in Rachel | u̇ as in use |
| i̇ as in ice | v̇ as in veal |
| j̇ as in jail | ẇ (no name) |
| k̇ as in kale | ẋ as in extra |
| l̇ as in elbow | ẏ as in wise |
| ṁ as in empty | ż as in zebra |

It will be noted from the above Table 2 that the black dot coding of the phonic characters often allows the sound represented by several traditional alphabetic characters to be expressed with a single coded phonic character. For example, the traditional English word "empty" becomes "ṁ↗ṫ" and "teepee" becomes "ṫ↗ṗ". (The additional coding symbols will be discussed below.) It should be appreciated that this coding of phonic characters may be accomplished through the use of various symbol configurations, and the use of a black dot is merely illustrative of a coding symbol which will accomplish such coding function.

The phonetic reading method of the present invention also utilizes twelve (12) additional coded translation characters, hereinafter referred to as the "special twelve" or "Dandy Dozen" as follows:

⊙   ♂   ⊕   ⊖   ⊕   ⓢ   ꜱ   ·t   t   ẇ   ε   ʙ

These coded translation characters are used to express traditional language sounds not otherwise expressable by the coded or uncoded phonic characters of the present method. Table 3 below illustrates the traditional sound associated with each such phonic symbol.

TABLE 3

| | | |
|---|---|---|
| ⊙ as in oil | as in Asia | ⓢ |
| ♂ as in order | as in that | ·t |
| ⊕ as in ouch | as in thin | t |
| ⊖ as in moon | as in why | ẇ |
| ⊕ as in book | as in chop | ε |
| ⓢ as in ship | as in honk | ʙ |

It will be noted that the special twelve consist of traditional alphabetic characters coded with either selectively positioned dots or selectively disposed lines. This particular manner of coding enhances the ease with which the symbol configurations can be graphically reproduced, but it should be appreciated that this coding may be accomplished through the use of various symbol configurations.

To further aid in conveying proper pronunciation, the method of the present invention utilizes sound breaker coding symbols for dividing the sounded syllables of a given word. In one preferred embodiment, the sound breaker symbols are represented as inverted V-shaped symbols placed below and between the sounded syllables of a word. For example, the traditional English "individual" would be expressed as "ṅ ʌ du ʌ vi↗ʌ j⊖ʌl". These sound breaker symbols are auditory syllabic symbols as opposed to visual syllabic symbols and thus are placed in accordance with the manner in which a word is vocalized and not in accordance with the traditional visual keys to syllabication. Further, an elevator voice coding symbol is used to indicate the accented or stressed syllable. In one preferred embodiment of the method, the elevator voice symbol is represented by an arrow following, and pointing back to, the appropriate stressed syllable. For example, the traditional English "people" is expressed as "ṗ↗ʌ pl↗" and the traditional "Tennessee" becomes "tṅ ʌ u ʌ ċ↗". further examples of such syllabic division and the application of the method in general are as follows:

| | | |
|---|---|---|
| Example 1. | excusably | x ʌ q↗ʌ zu ʌ ble |
| Example 2. | effervescent | f ʌ r ʌ vs↗ʌ nt |
| Example 3. | copyright | co↗ʌ p ʌ rit |
| Example 4. | persuasion | pr ʌ swa↗ʌ n |
| Example 5. | moisture | m s↗ʌ ⊙ r |
| Example 6. | conscience | con↗ʌ ⊙ ns |

Because the preferred embodiment of the method of the present invention utilizes traditional alphabetic characters, and necessarily alters the graphic expression of the words which have been expressed in accordance with the method, on occasion words expressed using the method will appear visually identical to, or substantially similar to, traditional English words or phonetic patterns which are totally unrelated. For example, the word "hair" when translated in accordance with the method becomes "her" which may be confused with the traditional English "her". Thus, in order to break this visual error and eliminate any confusion, the method employs fallen letter coding whereby the traditional English "hair" is expressed as "hₑr", thus, visually differentiating it from the traditional English "her". Further examples of this fallen letter coding are as follows:

| | | |
|---|---|---|
| Example 1. | worry | wŕ̄ė |
| Example 2. | kitty | cᵢt̆ t |
| Example 3. | off | oᶠ |
| Example 4. | called | cₒld |

In applying the phonetic reading method of the present invention to teach a student to read, the student is first taught the sounds associated with the coded and uncoded phonic characters, including the special twelve and other coding symbols. It will be appreciated that in order to utilize the method, a student need learn little more than the traditional alphabet (their names and sounds), and the special twelve. Thereafter, when supplied with the sounded translation of the present method, the student will be able to determine the correct pronunciation of any traditional English word without assistance from an instructor. For instance, one teaching application involves providing the student with a card having a traditional English word printed on one side and the word translated in accordance with the present method printed on the reverse side. The student first attempts to pronounce the traditional English word. Should the student be unable to pronounce the word, or wish to verify the correct pronunciation, the student may turn the card over and obtain the correct pronunciation of the word using the sounded translation of the present method.

Further, the application of the method is not limited to single word translation. When supplied with text translated in accordance with the present method, the student is able to read English text without assistance, verifying pronunciation as the student reads, eliminating the need for the student to seek assistance every time the student comes upon a word which is unfamiliar. For example, the student is reading the given text "Are you still intelligently interested and eagerly involved?" and stumbles on the word "intelligently". The student, without assistance, turns to the phonetic translation and finds "r u stil n tl u jnt le n tr s tud and e gr le n volvd", locates the translation of the word in question and obtains the correct pronunciation. Further examples of the English text and the corresponding phonetic translation of the present method are as follows:

1. It has not seemed difficult so far, has it? it haz not cmd di fu cult so fr haz it
2. Games are lots of fun if friends will play honestly. gamz r lots uv fun if frnds wil pla o nust le Giving the student the ability to correct or verify pronunciation on his or her own greatly reduces the time that an instructor is required to spend with any given student, and enhances the student's self-esteem through self-reliance. Further, the student may approach increasingly difficult materials without anxiety, and does not reinforce error patterns when left alone to work.

As indicated above, the phonetic language translation method of the present invention may be used in connection with various languages. However, additional symbols may be necessary for use with some languages. For example, in applying the system to German, it becomes necessary to have a symbol for the German uvular "r", for instance the symbol " ", or in the case of the Spanish trilled "r", the symbol " ". Thus, it will be appreciated that the phonic language translation method of the present invention may be adapted to other languages with few alterations.

Although the method of the present invention has been discussed with respect to the specific examples, it is not intended that such specific examples be limitations upon the scope of the invention except insofar as is set forth in the following claims.

I claim:

1. A phonetic language translation method for translating a word of any one of various languages into a graphically expressed phonetically correct sounded translation of said word, said method comprising the steps of:

eliminating all silent alphabetic characters, or groups of alphabetic characters, from said word;

representing all said alphabetic characters, or combinations of said characters, of said word which phonetically express the traditional speech sound of a single said alphabetic character with said single alphabetic character;

representing all said alphabetic characters, or combinations of said characters, of said word which phonetically express the alphabetic characters name of a single said alphabetic character with said single alphabetic character and a first coding symbol placed proximate said single alphabetic character; and representing all said alphabetic characters and combinations of said characters of said word which phonetically express a sound other than said traditional speech sound of said single alphabetic character, or said alphabetic character name of said single alphabetic character, with a preselected coded translation character representative of each said other sound.

2. The phonetic reading method of claim 1 wherein said first coding symbol comprises a black dot.

3. The phonetic language translation method of claim 1 comprising the further step of dividing said word into said word's sounded syllables.

4. The phonetic language translation method of claim 3 comprising the further step of placing a second coding symbol between said sounded syllables to mark the division of said syllables.

5. The phonetic language translation method of claim 4 comprising the further step of placing a third coding symbol proximate the stressed or accented syllable of said word.

6. The phonetic language translation method of claim 1 comprising the further step of altering the horizontal alignment of at least one of said characters of said sounded translation whenever said sounded translation of said word, as graphically expressed, appears visually similar to an untranslated traditionally expressed word so as to break said visual similarity.

7. A phonetic language translation method for translating a word of any one of various languages into a graphically expressed phonetically correct sounded translation of said word, said method comprising the steps of:

eliminating all silent alphabetic characters, or groups of alphabetic characters, from said word;

representing all said alphabetic characters, or combinations of said characters, of said word which phonetically expressed the traditional speech sound of a single said alphabetic character with said single alphabetic character;

representing all said alphabetic characters, or combinations of said characters, of said word which phonetically express the alphabetic character name of a single said alphabetic character with said single alphabetic character, and a first coding symbol placed proximate said single alphabetic character, said first coding symbol comprising a black dot placed above said single alphabetic character;

representing all said alphabetic characters and combinations of said characters of said word which phonetically express a sound other than said traditional speech sound of said single alphabetic character, or said alphabetic character name of said single alphabetic character, with a preselected coded translation character representative of each said other sound;

dividing said word into said word's sounded syllables and placing a second coding symbol between said sounded syllables to mark the division of said syllables, said second coding symbol comprising an inverted v-shaped character;

placing a third coding symbol proximate the stressed or accented syllable of said word, said third coding symbol comprising an arrow pointing toward said stressed or accented syllable; and altering the horizontal alignment of at least one of said characters of said sounded translation whenever said sounded translation of said word as, graphically expressed, appears visually similar to an untranslated traditionally expressed word so as to break said visual similarity.

* * * * *

UNITED STATES PATENT AND TRADEMARK OFFICE
CERTIFICATE OF CORRECTION

PATENT NO. : 4,609,357

DATED : Sep. 2, 1986

INVENTOR(S) : Gwendolyn M. Clegg

Page 1 of 2

It is certified that error appears in the above-identified patent and that said Letters Patent is hereby corrected as shown below:

| Columns | Lines |
|---|---|
| 3 | 50 |

(corrections shown with proofreader's marks: m̌ať, ťṗ, W)

65

| 4 | 49 |

W prʌswǎʌšn mosʌ̌er conʌ̌ens

UNITED STATES PATENT AND TRADEMARK OFFICE
CERTIFICATE OF CORRECTION

PATENT NO. : 4,609,357
DATED : Sep, 2, 1986
INVENTOR(S) : Gwendolyn M. Clegg

It is certified that error appears in the above-identified patent and that said Letters Patent is hereby corrected as shown below:

Columns      Lines

5

42 & 43

ṙ ů stil ṅ∧tĭ∧u∧jnt∧lė
ṅ∧tr∧ṡ∧tud and ė∧gr∧lė ṅ∧volvd 5      50 gȧmz ṙ lots uv fun if frṅz wil plȧ o∧nust∧lė

Signed and Sealed this

Twenty-fourth Day of February, 1987

Attest:

DONALD J. QUIGG

Attesting Officer    Commissioner of Patents and Trademarks